(12) United States Patent
Kaus et al.

(10) Patent No.: US 7,489,313 B2
(45) Date of Patent: Feb. 10, 2009

(54) METHOD OF SEGMENTING A THREE-DIMENSIONAL DATA SET ALLOWING USER CORRECTIONS

(75) Inventors: Michael Kaus, Hamburg (DE); Holger Timinger, Hamburg (DE); Vladimir Pekar, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 248 days.

(21) Appl. No.: 10/537,883

(22) PCT Filed: Dec. 5, 2003

(86) PCT No.: PCT/IB03/05664

§ 371 (c)(1),
(2), (4) Date: Jun. 7, 2005

(87) PCT Pub. No.: WO2004/053792

PCT Pub. Date: Jun. 24, 2004

(65) Prior Publication Data

US 2006/0149511 A1 Jul. 6, 2006

(30) Foreign Application Priority Data

Dec. 12, 2002 (EP) ................... 02102735

(51) Int. Cl.
*G06T 15/00* (2006.01)
(52) U.S. Cl. .................. 345/420; 345/419; 345/426; 345/428
(58) Field of Classification Search ................. 345/419, 345/420, 426, 428
See application file for complete search history.

(56) References Cited

U.S. PATENT DOCUMENTS

| | | | | |
|---|---|---|---|---|
| 6,106,466 A | | 8/2000 | Sheehan et al. | 600/443 |
| 6,108,006 A | | 8/2000 | Hoppe | 345/420 |
| 6,124,864 A | * | 9/2000 | Madden et al. | 345/473 |
| 6,137,492 A | | 10/2000 | Hoppe | 345/420 |
| 6,201,543 B1 | * | 3/2001 | O'Donnell et al. | 345/420 |
| 7,010,164 B2 | * | 3/2006 | Weese et al. | 382/173 |
| 2001/0009974 A1 | | 7/2001 | Reisfeld | 600/407 |
| 2002/0026299 A1 | | 2/2002 | Kknoplioch et al. | 703/2 |
| 2002/0184470 A1 | | 12/2002 | Weese et al. | 382/173 |

OTHER PUBLICATIONS

Lai et al., On Regulation, Formulation and Initialization of the Active Contour Models (Snakes); Asian Conf. on Computer Vision, Nov. 1993, pp. 542-545.*

(Continued)

*Primary Examiner*—Phu K Nguyen

(57) ABSTRACT

The invention relates to a method of segmenting a three-dimensional structure from a three-dimensional, and in particular medical, data set while making allowance for user corrections. The method is performed with the help of a deformable three-dimensional model whose surface is formed by a network of nodes and mashes that connect these nodes. Once the model has been positioned at the point in the three-dimensional data set at which the structure to be segmented is situated and positions of nodes have, if necessary, been changed by known methods of segmentation, any desired nodes can be displaced manually. The nodes of the model are re-calculated by making weighted allowance for the nodes that have been displaced manually.

15 Claims, 4 Drawing Sheets

OTHER PUBLICATIONS

Yezzi et al., A Geometric Snake Model for Segmentation of Medical Imagery, IEEE transaction on Medical Imaging, Apr. 1997, pp. 199-209.*

Cohen et al., Finite Element Methods for Active Contour Models and Balloons for 2D and 3D Images, IEEE Transaction on Pattern Analysis and Machine Intelligence, Nov. 1993; pp. 1-56.*

Lorensen et al, "Marching Cubes: A High Resolution 3D Surface Construction Algorithm", Computer Graphics, vol. 21, No. 4, Jul. 1987.

Mc Inerney et al, "Deformable Models in Medical Image Analysis: A Survey", Medical Image Analysis, vol. 1, No. 2, 1996, pp. 91-108.

Kass et al, "Snakes: Active Contour Models", International Journal of Computer Vision, 321-331, 1998.

* cited by examiner

METHOD OF SEGMENTING A THREE-DIMENSIONAL DATA SET ALLOWING USER CORRECTIONS

The invention relates to a method of segmenting a three-dimensional structure from a three-dimensional, and in particular medical, data set while making allowance for user corrections. The method is performed with the help of a deformable three-dimensional model whose surface is formed by a network of mashes that connect the nodes. The invention also relates to an image-processing arrangement for performing the method and to a computer program for controlling the arrangement.

A method of the above-mentioned kind, in which however there is, a priori, no provision for user corrections, is known from an article by McInerney et al. "Deformable models in medical image analysis: A survey" in the journal Medical Image Analysis, 1(2): 91-108, 1996. In this method, a deformable model is represented as an elastic surface that is able to change its shape and position under the prompting of what is termed internal and external energy. The model having been generated on the basis of pre-existing medical knowledge about the structure to be segmented, the function of the internal energy is to maintain the shape of the model as well as possible, while the external energy is responsible for moving the surface of the model towards the edges of the structure. The external energy is derived from the three-dimensional data set. The mashes are, for example, each in the form of a triangle whose corners are defined by three adjacent nodes on the surface of the model.

In the known method, candidate points, i.e. points that are probably situated on the surface of the structure to be segmented, which surface is usually characterized by a pronounced gradient shown by the values in the data set, are looked for in the three-dimensional data set along normals to the surfaces of the triangles. Once candidate points have been determined for the mashes of the network that defines the surface of the model, the nodes of the model are re-calculated on the basis of the candidate points that have been found. The new nodes are so calculated in this case that the weighted sum of the internal and external energies is a minimum for them. The method is then repeated a number of times on the basis of the new nodes calculated, with the model becoming a closer approximation of the shape of the structure to be segmented with each repeat. This iterative process comes to an end as soon as a discontinuance criterion, e.g. a given number of repeats, is satisfied.

What is disadvantageous about this and other automatic methods of segmentation is that segmentation errors occur, due for example to artifacts in the three-dimensional data set. Such segmentation errors often occur when the distance between a structure to be segmented and another structure is small. There are various known methods of avoiding segmentation errors, some of which will be explained below.

A simple method of preventing or correcting segmentation errors is to repeat the matching-up process described above with different initial models and with the deformable model in different initial positions relative to the structure to be segmented. This method calls for the result of the matching-up process to be foreseen and hence for a great deal of experience on the part of the user. Foreseeing the result in this way is almost impossible where the structures to be segmented are complex. Also, the method is very time-consuming.

A method of the generic kind on the other hand gives the user an opportunity of intervening in the matching-up process, while it is proceeding, by deforming the model manually by, for example, displacing one or more nodes. What is disadvantageous about this method is user corrections cannot be shown visually in a clear way for the whole of the structure to be segmented. The deformable model therefore has to be checked, and if necessary corrected, layer by layer. Accurate correction is therefore very time-consuming.

Another known method of the generic kind comprises, after automatic segmentation has taken place, deforming the matched-up model manually, e.g. by displacing a node. The automatic segmentation is then performed for a second time with this deformed model. What is problematic about this method is that the step of the method in which the internal and external energies are minimized moves the nodes that have been displaced manually back to their original positions, because it is at these positions that the energy of the deformable model is at a minimum.

It is an object of the present invention to specify a method by which segmentation errors can be avoided or corrected at a low cost in time and computing work. This object is achieved in accordance with the invention by a method of segmenting a three-dimensional structure from a three-dimensional, and in particular medical, data set while making allowance for user corrections, which method has the following steps:

a) provision of a three-dimensional deformable model whose surface is formed by a network having mashes that interconnect nodes at the surface of the model,
b) positioning of the model at a point in a three-dimensional data set at which the structure to be segmented is situated,
c) manual displacement of nodes,
d) re-calculation of the nodes of the model with weighted allowance for nodes that have been displaced manually.

In contrast to known methods, in the case of the invention weighted allowance is made for the nodes that have been displaced manually when the deformable model is re-calculated. This allows each node that has been displaced manually to be allowed for to a different degree in the deformation, which allows user correction to take place at only a low cost in terms of time.

A preferred method, in which a greater allowance is made for displaced nodes whose distance from a boundary surface of the structure to be segmented is small than for displaced nodes whose distance from the said boundary surface is greater, is described in claim 2.

Claim 3 defines a preferred method of re-calculating the nodes that gives good results as far as segmentation is concerned.

An image-processing arrangement for performing the method according to the invention is described in claim 4. Claim 5 defines a computer program for controlling the image-processing arrangement described in claim 4.

These and other aspects of the invention are apparent from and will be elucidated with reference to the embodiments described hereinafter.

Figure 1:
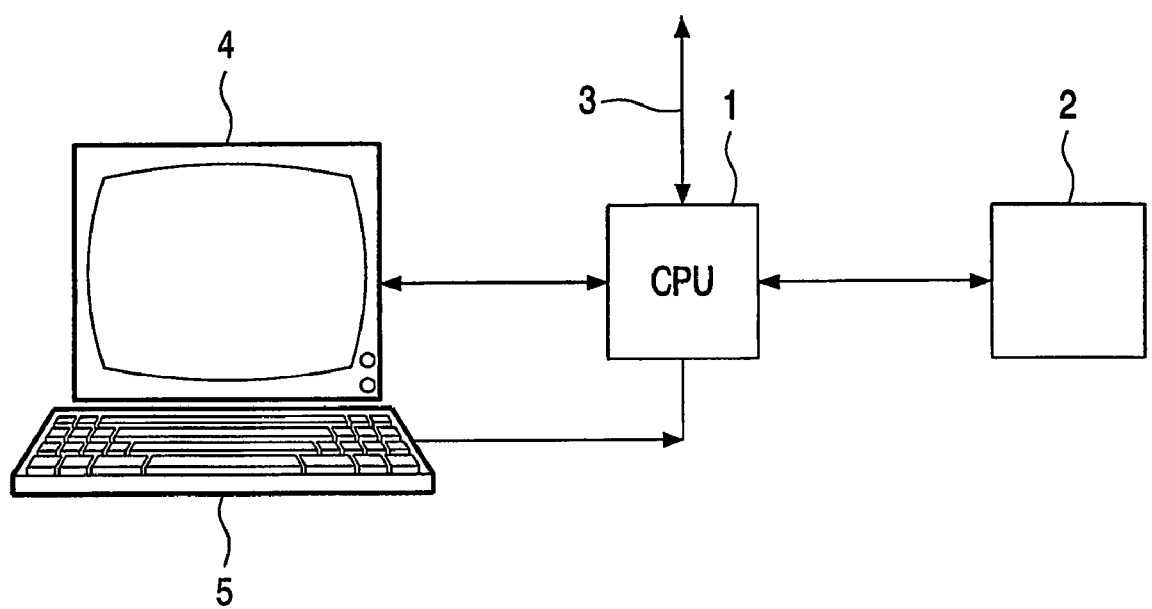
FIG. 1 is a diagrammatic view of an image-processing arrangement suitable for performing the method according to the invention.

The image-processing arrangement shown in FIG. 1 comprises an image-processing and control processor 1, having a memory 2 in which a deformable model of a structure to be segmented, and a three-dimensional and in particular medical data set, may be stored. The image-processing and control processor 1 may be connected, by a fiber-optic cable 3 for example, to an imaging means (not shown) such as a magnetic resonance or computer tomography unit. The structure segmented by the image-processing and control processor 1 can be shown on a monitor 4. The user can access the image-processing and control processor 1 via a keyboard 5 or by means of other input units that are not shown in FIG. 1.

Figure 2:
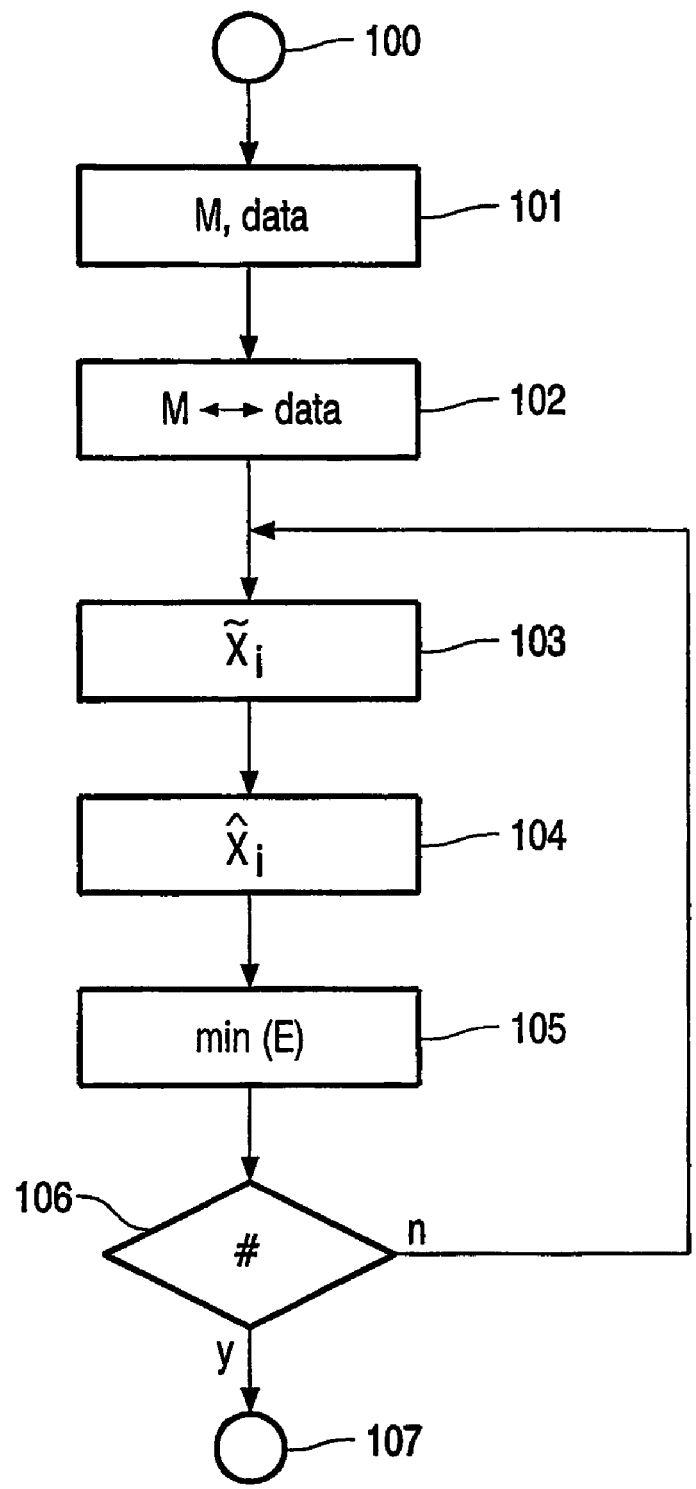
FIG. 2 is a flow chart of the method according to the invention.

FIG. 2 is a flow chart of a method of segmentation that can be carried out with the image-processing arrangement shown in FIG. 1.

After initialization in step 100, in step 101 the deformable model M of a structure to be segmented, and a three-dimensional data set containing the structure to be segmented, are loaded.

Figure 3:
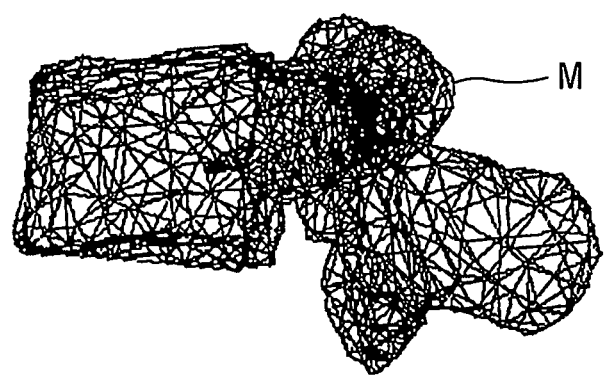
FIG. 3 shows a deformable model of a dorsal vertebra.

FIG. 3 shows a deformable model M that in the present embodiment is a model of a dorsal vertebra. Other structures too can be segmented by means of a deformable model, e.g. the head of the femur (the structure situated at the top end of the thighbone) or an organ, such as the heart, for example. The surface of the deformable model M is formed by a network whose triangular mashes each connect together three adjoining nodes on the surface of the model. Rather than being triangulated in this way, the surface of the model could also be defined by any desired structure of polygons in which the mashes of the network were not triangular but connected together a number of nodes other than three to form a polygon.

A deformable model can be generated from a plurality of training data sets in each of which the same object has been segmented manually by a skilled operator in such a way that each object segmented has the same topology. The taking of a mean, and in the simplest case the taking of an arithmetic mean, over all the objects segmented produces an object that is referred to as a deformable model.

The method according to the invention can also be used where the deformable model has been generated in other ways, e.g. by triangulating a model of a dorsal vertebra. A method of triangulation that is frequently employed is known from the article "Marching cubes: A high resolution 3d surface construction algorithm", W. E. Lorensen and H. E. Cline, Computer Graphics, 21(3): 163-169, 1987.

In step 102, the deformable model M is so oriented relative to the structure to be segmented that the surface of the model is as close a match as possible to the contours of the structure to be segmented.

In step 103, parts of the deformable model can be altered manually. What a user can do in this case is to displace triangular surfaces or individual nodes in the model. In step 104, a candidate point $\hat{x}_i$ is determined for each mask, i.e. in the present embodiment for each triangle on the surface of the deformable model. The candidate point $\hat{x}_i$, is situated on the normal $n_i$ to the surface of a triangle, the normal $n_i$ to the surface being a unit vector and originating from a center point $x_i$ of the triangular surface. The positions $x_i$ of the center points define the positions of the relevant triangular surfaces before they were displaced manually in step 103, as they may in some cases have been. The position of the candidate point on the normal to the surface is now selected in such a way that the function $$f(j)=Dj^2\delta^2-F(x_i+j\delta n_i) \quad (1)$$

is a minimum. In this function, D is a freely selectable, but constant, value that states how much allowance is made for the distance from the surface of the triangle in determining a candidate point. Also, d is a scalar distance between two successive points on the normal to the surface and j is an index character that designates points on the normal to the surface. The so-called edge-detection function F(x) is a measure of the probability of point x being situated on the surface of the structure to be segmented. This function may be calculated from, for example, the following equation:

$$F(x)=\pm n^T g(x) \quad (2)$$

In this equation, g(x) is the gradient of the data values (which are brightness values in the present embodiment) in the three-dimensional data set at point x. Because the function F(x) is the scalar product of the vectors n and g(x), the function becomes particularly large when the gradient extends in the direction of the normals to the surface. What this means is that, if it is assumed that the brightness values in the three-dimensional data set change sharply at the boundary surface of the structure to be segmented, then the function F(x) is particularly large if the normal to the surface is perpendicular to this boundary surface. In the present embodiment, it is assumed that the data values for the structure to be segmented are larger in the region of the boundary surface than the data values outside the structure. Hence, it is assumed that the gradient g(x) points into the structure to be segmented. The normal n to the surface on the other hand points outwards. The sign of the function F(x) in equation (2) is therefore selected in such a way in the present embodiment that function F(x) becomes positive in the case of a boundary as defined here. In other embodiments, the sign may also be so selected that, where the relative sizes of the data values in the region of the boundary surface are as mentioned above, the function F(x) is negative.

The candidate point $\hat{x}_i$ is calculated from the following equation:

$$\hat{x}_i = x_i + \delta j_i n_i \quad (3)$$

where $j_i$ is that integer value of j for which the function defined by equation (1) is a minimum.

Once triangular surfaces or nodes have been displaced manually and a candidate point has been determined for each triangular surface on the surface of the deformable model, in step 105 the surface of the deformable model is matched to the candidate points found and to the manually displaced triangular surfaces or nodes. When this is done, the model is deformed in such a way that the so-called energy function $$E=E_{ext}+\alpha E_{int}+\beta E_{user} \quad (4)$$

is a minimum. In this equation, $E_{ext}$ is the external energy that moves the triangular surfaces in the direction of the candidate points determined in step 104, whereas $E_{int}$ is the internal energy that acts to oppose any deformation of the network. The energy $E_{user}$ is an energy that causes the model to deform in the direction of the nodes or triangular surfaces that are displaced by the user. The weighting factors $\alpha$ and $\beta$ are typically selected in such a way that the three energies contribute in substantially equal proportions to the total energy.

What may be taken as the external energy is any quantity that becomes smaller as the deformable model approaches the structure defined by the candidate points. In the present embodiment, the external energy $E_{ext}$ is defined by the following equation:

$$E_{ext} = \sum_\Delta w_i (x_i - \hat{x}_i)^2 \quad (5)$$

where the summing takes place over all the triangles. The weighting factor $w_i$ is calculated from the following equation:

$$w_i = \max\{0, F(\hat{x}_i) - D j_i^2 \delta^2\} \quad (6)$$

According to equation (6), the weighting factor for candidate points $\hat{x}_i$ that, with a high probability, are situated on the boundary surface of the structure to be segmented, i.e. that have a high $F(\hat{x}_i)$ value, and whose distance from the triangular surfaces is small, is larger than for other candidate points.

The internal energy $E_{int}$ may be any quantity that becomes all the smaller the less the model is deformed. In the present embodiment, internal energy is calculated from the equation:

$$E_{int} = \sum_{i=1}^{V} \sum_{j \in N(i)} ((x_i - x_j) - sR\Delta_{ij})^2 \quad (7)$$

In this equation, V is the number of triangular surfaces in the model, s is a scaling factor, R is a rotation matrix and $\Delta_{ij}$ is the distance between two center points of two triangular surfaces in the original, undeformed model. The set N(i) contains the center points of those triangular surfaces that are adjacent to the triangular surface having the center point $x_i$. When energy is minimized for the first time under equation (4), s=1 and R is the unit matrix.

The energy $E_{user}$ may be any term that becomes smaller as the deformable model is brought closer to the triangular surfaces or nodes that have been displaced, and that weights the contributions made by the individual triangular surfaces or nodes that have been displaced. In the present embodiment, the energy $E_{user}$ is calculated from the following equation:

$$E_{user} = \sum_\Delta \tilde{w}_i (x_i - \tilde{x}_i)^2 \quad (8)$$

where the summing takes place over all the triangles that were altered manually in step 103 and $\tilde{x}_i$ are the center points of these triangles. Multiplication by the weighting factors $\tilde{w}_i = \max\{0, F(\tilde{x}_i)\}$ causes greater allowance to be made for those triangular surfaces that were displaced by the user to a boundary surface of the structure to be segmented than for other triangular surfaces.

In other embodiments, allowance could, in addition, be made, by means of the weighting factors $\tilde{w}_i$, for the distance between the center points of the manually displaced triangular surfaces and the candidate points. This could, for example, be achieved by weighting factors of the following form $$\tilde{w}_i = \max\{0, F(\tilde{x}_i) - D\|\tilde{x}_i - \hat{x}_i\|\}). \quad (9)$$

Greater allowance would then be made for manually displaced triangular surfaces that had been positioned close to the surface of the structure to be segmented than for triangles that had been displaced to positions farther away from the structure to be segmented.

Once the center points $x_i$ of the triangular surfaces of the deformed model have been determined by minimizing the energy in accordance with equation (4), a new scaling factor s and a new rotation matrix R are determined. When this is done, the scaling factor and rotation matrix are selected, while allowing for the current center points $x_i$, in such a way that the internal energy becomes a minimum. In other embodiments, the center points $x_i$, the scaling factor s and the rotation matrix R could be determined simultaneously by turning the scaling factor and rotation matrix too into variables when determining the total energy E.

Once the deformable model has been matched to the structure to be segmented in step 105, a check is made in step 106 to see whether a discontinuance criterion has been satisfied. This discontinuance criterion may, for example, be a predetermined number of repeats of steps 103 to 105 or a change in the position of the nodes for which hardly any scope remains. If the discontinuance criterion is met, the method of segmentation comes to an end at step 107. If, on the other hand, the discontinuance criterion has not been met, the method continues with step 103. In other embodiments, it could also be continued with step 104.

The model obtained by means of the method of segmentation can be stored and shown on the monitor. It represents the structure to be segmented that is contained in the three-dimensional data set.

In other embodiments, steps 104 and 105 could be interchanged with step 103. What would then be determined first would be the candidate points by means of which the model would then be deformed with the external and internal energies minimized. In the next step, the user would have an opportunity to displace individual triangular surfaces or individual nodes of the deformable model. If the subsequent check for satisfaction of the discontinuance criterion showed that it had not yet been satisfied, then new candidate points would be determined and the model would again be deformed while minimizing the total energy, including $E_{user}$.

What is more, in other embodiments an additional deformation step 105 may be inserted between steps 103 and 104. This allows a check to be made each time on the effect the candidate points and the displaced triangular surfaces are having on the deformation of the model.

Figure 4:
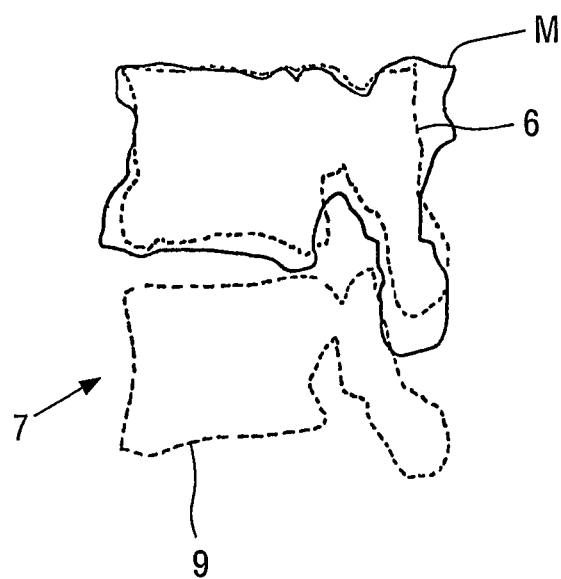
FIG. 4 shows part of a spinal column with a deformable model positioned on a dorsal vertebra.
Figure 5:
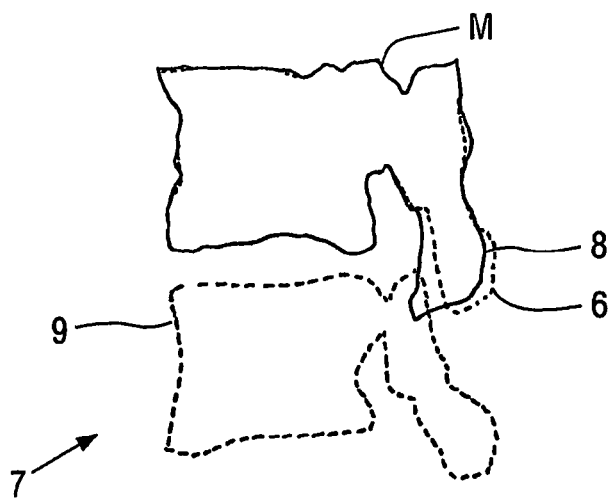
FIG. 5 shows the deformable model positioned on the dorsal vertebra after a known matching-up method has been performed.
Figure 6:
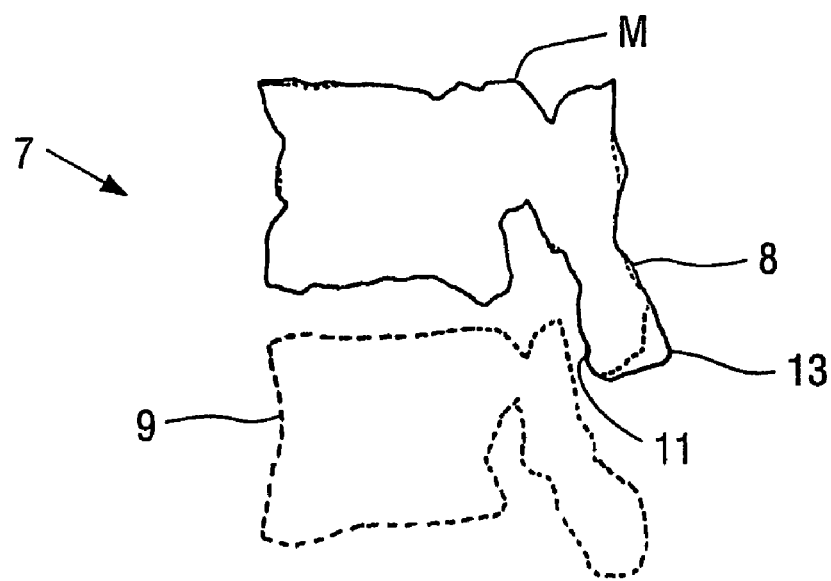
FIG. 6 shows the deformable model positioned on the dorsal vertebra after manual correction.
Figure 7:
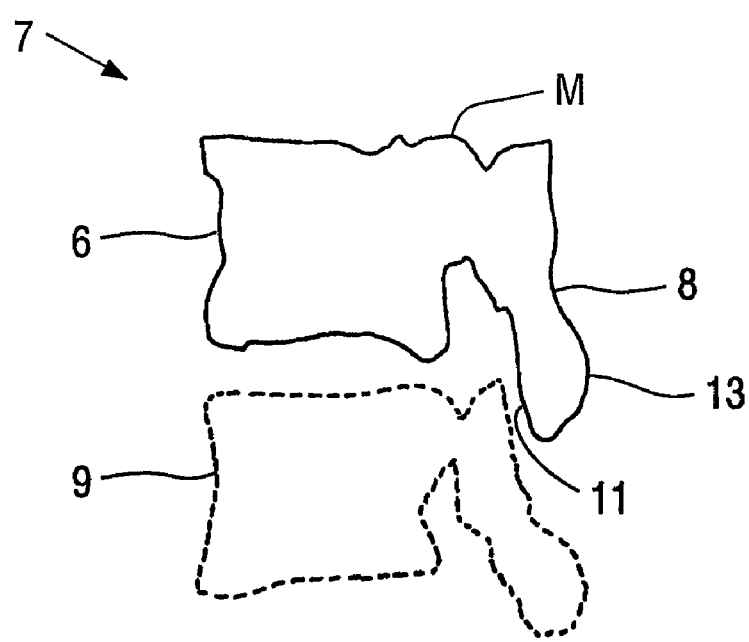
FIG. 7 shows the deformable model positioned on the dorsal vertebra after the method according to the invention has been performed.

The benefits of the method according to the invention can be explained by reference to FIGS. 4 to 7. What can be seen in these Figures is a two-dimensional sagittal slice through a three-dimensional data set, the data set having been generated by means of a computer tomograph in this embodiment. A deformable model M has been positioned around a dorsal vertebra 6 of a spinal column 4. FIG. 4 shows this positioning before a matching process is carried out. A typical result of the deformation of the model M by the method mentioned in the introduction can be seen in FIG. 5. In the region of the right-hand section 8 of the model M a segmentation error has occurred because section 8 of the model also contains parts of the adjacent, lower dorsal vertebra 9. In FIG. 6, a manual attempt has been made to correct the segmentation error roughly by deforming section 8 of the model, i.e. by moving part of it towards the right. After this rough correction, the edge region 11 of section 8 of the model is a good match for the boundary surface of the structure to be segmented, whereas the right-hand edge region 13 of section 8 of the model is not such a good match for the boundary surface. FIG. 7 shows the model M after the method according to the invention has been performed, where the total energy was minimized in accordance with equation (4). There has been hardly any change in the left-hand edge region 11. The right-hand edge region 13 on the other hand has been more severely deformed and is a good match for the boundary surface. The reason for the different treatments given to the manually altered edge sections 11, 13 is the weighting factors $\tilde{w}_i$ in equation (8) or (9) as the case may be. The edge section 11 was situated on or close to the boundary surface of the structure to be segmented, which meant that the edge-detection function $F(\tilde{x}_i)$ was-large, which gave a large weighting factor. Edge section 13 on the other hand was a long way away from the boundary surface, which meant that $F(\tilde{x}_i)$ gave a low value and this resulting in a small weighting factor or $\tilde{w}_i=0$. The matching of the edge region 13 to the structure to be segmented was thus performed solely by minimizing the energy $E_{ext}+aE_{int}$.

By assessing the nodes that have been displaced manually, it becomes unnecessary for each node or each triangular surface in the model to be moved as accurately as possible to the surface of the structure to be segmented. Therefore, what this assessment makes possible is user correction at only a low cost in terms of time.

LIST OF REFERENCE NUMERALS

M Deformable model
1 Image-processing and control processor
2 Memory
3 Fiber-optic cable
4 Monitor
5 Keyboard
6 Dorsal vertebra (structure to be segmented)
7 Spinal column
8 Section of the deformable model
9 Dorsal vertebra
11,13 Edge of section 8

The invention claimed is:

1. A method of segmenting a three-dimensional structure from a three-dimensional data set while making allowance for user corrections, having the following steps:
   a) provision of a three-dimensional deformable model (M) whose surface is formed by a network of mashes that connect nodes at the surface of the model,
   b) positioning of the model (M) at a point in a three-dimensional data set at which the structure to be segmented is situated,
   c) manual displacement of nodes,
   d) re-calculation of the nodes by a control unit of the model (M) in weighted consideration of the nodes that have been displaced manually.

2. A method as claimed in claim 1, wherein step d) comprises the following steps:
   determination of a candidate point for each sub-surface defined by mashes of the model, each candidate point being situated on a normal to the sub-surface,
   assignment of a weighting factor to each node that has been displaced, the weighting factor being larger the smaller distance between the displaced node and a boundary surface of the structure to be segmented,
   re-calculation of the nodes of the model while allowing for the candidate points determined, the displaced nodes, and the weighting factors assigned.

3. A method as claimed in claim 1, characterized in that step d) the nodes are re-calculated by minimizing a weighted sum of external energy, internal energy and an energy that takes into account the manually displaced nodes.

4. An image-processing arrangement for performing the method claimed in claim 1, comprising:
   a memory unit for storing a deformable model whose surface is formed by a network of mashes that connect the nodes at the surface of the model, and for storing a three-dimensional data set and in particular a medical data set,
   an image-reproduction unit for reproducing a structure to be segmented and the deformable model,
   a calculating unit for re-calculating the nodes of the model in weighted consideration of nodes which have been displaced manually,
   a positioning unit for positioning the model at the point in the three- dimensional data set at which the structure to be segmented is situated,
   a control unit for controlling the memory unit, the image-reproduction unit, the calculating unit and the positioning unit to perform the following steps:
   a) provision of a three-dimensional deformable model (M) whose surface is formed by a network of mashes that connect nodes at the surface of the model,
   b) positioning of the model (M) at a point in a three-dimensional data set at which the structure to be segmented is situated,
   c) manual displacement of nodes,
   d) re-calculation of the nodes of the model (M) in weighted consideration of the nodes that have been displaced manually.

5. The arrangement of claim 4, wherein the control unit controls the memory unit, the image-reproduction unit, the calculating unit and the positioning unit to perform step d) by:
   determination of a candidate point for each sub-surface defined by mashes of the model, each candidate point being situated on a normal to the sub-surface,
   assignment of a weighting factor to each node that has been displaced, the weighting factor being larger the smaller distance between the displaced node and a boundary surface of the structure to be segmented,
   re-calculation of the nodes of the model while allowing for the candidate points determined, the displaced nodes, and the weighting factors assigned.

6. The arrangement of claim 4, wherein the control unit controls the memory unit, the image-reproduction unit, the calculating unit and the positioning unit to perform step d) by minimizing a weighted sum of external energy, internal energy and an energy that takes into account the manually displaced nodes.

7. The arrangement of claim 4, wherein the model (M) includes a plurality of masks of defined shape, and wherein re-calculation of the nodes of the model (M) includes for each of the plurality of masks determining a candidate point situated on a normal to the mask.

8. The arrangement of claim 7, wherein re-calculation of the nodes of the model (M) further includes minimizing an energy function that includes a weighted sum of: (1) an external energy that moves the masks in a direction toward the candidate points; (2) an internal energy that acts to oppose any deformation of the model: and (3) an energy that causes the model to deform in directions toward the nodes that are manually displaced in step c).

9. The method of claim 1, wherein the model (M) includes a plurality of masks of defined shape, and wherein re-calculation of the nodes of the model (M) includes for each of the plurality of masks determining a candidate point situated on a normal to the mask.

10. The method of claim 9, wherein re-calculation of the nodes of the model (M) further includes minimizing an energy function that includes a weighted sum of: (1) an external energy that moves the masks in a direction toward the candidate points; (2) an internal energy that acts to oppose any deformation of the model: and (3) an energy that causes the model to deform in directions toward the nodes that are manually displaced in step c).

11. A computer readable storage medium encoded with a computer program executable by a control unit of an image processing arrangement for controlling a memory unit, an image-reproduction unit, a calculating unit and a positioning unit of an image-processing arrangement, to perform a method according to the following steps:

a) provision of a three-dimensional deformable model (M) whose surface is formed by a network of mashes that connect nodes at the surface of the model, b) positioning of the model (M) at a point in a three-dimensional data set at which the structure to be segmented is situated, c) manual displacement of nodes by a control unit d) re-calculation of the nodes of the model (M) in weighted consideration of the nodes that have been displaced manually.

12. The computer readable storage medium of claim 11, wherein the computer program causes the control unit to control the memory unit, the image-reproduction unit, the calculating unit and the positioning unit to perform step d) by:

determination of a candidate point for each sub-surface defined by mashes of the model, each candidate point being situated on a normal to the sub-surface, assignment of a weighting factor to each node that has been displaced, the weighting factor being larger the smaller distance between the displaced node and a boundary surface of the structure to be segmented, re-calculation of the nodes of the model while allowing for the candidate points determined, the displaced nodes, and the weighting factors assigned.

13. The computer readable storage medium of claim 11, wherein the computer program causes the control unit to control the memory unit, the image-reproduction unit, the calculating unit and the positioning unit to perform step d) by minimizing a weighted sum of external energy, internal energy and an energy that takes into account the manually displaced nodes.

14. The computer readable storage medium of claim 11, wherein the model (M) includes a plurality of masks of defined shape, and wherein the computer program causes the control unit to control the memory unit, the image-reproduction unit, the calculating unit and the positioning unit to re-calculate of the nodes of the model (M) by determining, for each of the plurality of masks, a candidate point situated on a normal to the mask.

15. The computer readable storage medium of claim 14, wherein the computer program further causes the control unit to control the memory unit, the image-reproduction unit, the calculating unit and the positioning unit to re-calculate of the nodes of the model (M) by minimizing an energy function that includes a weighted sum of: (1) an external energy that moves the masks in a direction toward the candidate points; (2) an internal energy that acts to oppose any deformation of the model: and (3) an energy that causes the model to deform in directions toward the nodes that are manually displaced in step c).

* * * * *